United States Patent [19]

Pulvermacher

[11] Patent Number: 4,873,943
[45] Date of Patent: Oct. 17, 1989

[54] MILK FLOW INDICATOR

[75] Inventor: Ronald J. Pulvermacher, Cottage Grove, Wis.

[73] Assignee: Dairy Equipment Co., Madison, Wis.

[21] Appl. No.: 138,219

[22] Filed: Dec. 28, 1987

[51] Int. Cl.⁴ ............................................. A01J 3/00
[52] U.S. Cl. ................................. 119/14.16; 73/198; 119/14.15
[58] Field of Search ............... 119/14.08, 14.14, 14.15, 119/14.16, 14.17; 73/198

[56] References Cited

U.S. PATENT DOCUMENTS

| 1,309,457 | 7/1919 | Buckwalter | 119/14.16 |
| 2,102,275 | 12/1937 | Martin | 119/14.15 |
| 2,513,627 | 7/1950 | Dinesen | 119/14.16 |
| 2,697,944 | 12/1954 | Wenham . | |
| 3,007,436 | 11/1961 | Seaborne . | |
| 3,474,330 | 10/1969 | Dauphinee | 119/14.15 |
| 3,566,841 | 3/1971 | Gerrish | 119/14.15 |
| 3,630,681 | 12/1971 | Nelson | 119/14.08 X |
| 3,773,016 | 11/1973 | Needham et al. | 119/14.14 X |
| 3,786,782 | 1/1974 | Abrahamson | 119/14.08 |
| 3,973,520 | 8/1976 | Flocchini | 119/14.08 |
| 3,991,716 | 11/1976 | Reisgies | 119/14.08 |
| 4,022,158 | 5/1977 | Flocchini | 119/14.14 |
| 4,064,838 | 12/1977 | Mukarovsky et al. | 119/14.08 |
| 4,185,586 | 1/1980 | Flocchini | 119/14.15 X |
| 4,253,421 | 3/1981 | Slater et al. | 119/14.08 |
| 4,306,517 | 12/1981 | Nakamura | 119/14.14 |
| 4,348,984 | 9/1982 | Brayer | 119/14.08 |
| 4,433,577 | 2/1984 | Khurgin et al. | 73/290 V |
| 4,714,048 | 12/1987 | Jefferies et al. | 119/14.08 |

FOREIGN PATENT DOCUMENTS

| 2519518 | 11/1976 | Fed. Rep. of Germany | 119/14.15 |
| 897181 | 1/1982 | U.S.S.R. | 119/14.15 |
| 899020 | 1/1982 | U.S.S.R. | 119/14.15 |
| 1488251 | 12/1977 | United Kingdom | 119/14.15 |

Primary Examiner—Gene Mancene
Assistant Examiner—R. Thomas Price
Attorney, Agent, or Firm—Quarles & Brady

[57] ABSTRACT

A portable self-contained milk flow indicator is provided for dairy barn applications. The milk flow indicator consists of a milk sensing device, a timing and switching circuit, indicators of the condition of milk flow, and a rechargeable battery, all sealed in a self-contained portable unit which can be used at any point in the milk line of a conventional dairy barn milking operation. The indicator is also provided with a battery charger which can be mounted on the wash manifold of a dairy barn milk house so that when the indicator is placed on the wash manifold for cleaning the battery, housed in the indicator, will automatically be recharged.

21 Claims, 4 Drawing Sheets

MILK FLOW INDICATOR

FIELD OF THE INVENTION

The present invention is generally directed to a liquid flow indicator placed in a liquid flow passageway, and particularly directed to a milk flow indicator for indicating the flow of milk in a system under vacuum, for example, in a milking system in a milking parlor.

BACKGROUND OF THE INVENTION

Although there are a variety of uses for the device of the present invention, specific reference to the use of the present invention in a milking operation will be emphasized. When milking cows, goats or other milking animals with automated milking apparatus, it is important to determine the end of the milking period. Generally, the end of the milking period is determined by observing the udder being milked, the condition of the milk obtained or the quantity of milk as it flows in a milk line which has been provided with a transparent portion. For example, U.S. Pat. No. 3,007,436 to Seaborne discloses a milk flow indicator which comprises a sight glass for visual indication of the end of the milking period. U.S. Pat. No. 2,697,944 to Wenham also discloses a liquid flow indicator for a milking machine which indicates visually the state of milk flow through the indicator. U.S. Pat. No. 2,513,627 to Dinesen discloses a flow indicator for a milking machine having a transparent portion making it possible for the operator to detect milk flow at all times.

Other methods of determining the end of the milking period are also described in the prior art. U.S. Pat. No. 3,991,716 to Reisgies discloses an apparatus for sensing milk flow from an animal being milked using pneumatic controls without the use of electrical circuitry. U.S. Pat. No. 3,786,762 to Abrahamson et al. discloses a milk flow sensing valve unit comprising a float chamber housing a float member which holds the valve open when the milk is present to permit milk discharge. When the milk flow falls below a certain rate, the float lowers and closes the valve shutting off the vacuum supply causing the teat cups to fall away. U.S. Pat. Nos. 3,973,520 and 4,022,158 to Flocchini disclose a float detector comprising a cylindrical flow tube with a metal float. The milk in the tube causes the float to rise. As the level of milk drops, the float moves toward a metal detector at the bottom of the tube. When the float contacts the detector, a circuit is activated sensing the interruption of milk flow. If milk flow is then resumed, the float moves away from the detector and the detection of resumption of milk flow is resumed. Another patent which uses electrical sensors to determine liquid flow is U.S. Pat. No. 4,433,577 to Khurgin et al. U.S. Pat. No. 4,348,984 to Brayer discloses a flow system controller which automatically stops the milking operation when the flow of milk is decreased. The milk flow sensor employs a pair of electrodes to sense the flow of milk. The flow of milk causes an electric current to flow between the electrodes. When the milk flow drops off, an output signal stops the pulsator and produces a warning light. U.S. Pat. No. 4,306,517 to Nakamura discloses a milk flow sensor which signals the end of the milking operation. A pair of electrodes are used for detecting the quantity of milk flowing through the sensor. An alarm device signals the end of milking.

U.S. Pat. No. 4,253,421 to Slater et al. discloses a milk flow system connected to a stanchion which detects the flow of milk by means of a counterweight system. When milk is in the sensor, flow communication is opened allowing the vacuum system to operate. When the milk flow drops, the counterweight swings closing off the vacuum which automatically removes the teat claws.

SUMMARY OF THE INVENTION

The present invention is directed to a portable and detachable milk flow sensor which signals milk flow stoppage by means of an alarm signal and a light. If milk flow resumes, the signal automatically stops without requiring any manual resetting. The electronic circuit includes a pair of stainless steel electrodes located in the path of milk flow activated by a battery powered source. When the entire milking operation is complete, the milk flow sensor may be removed from the milking stanchion and placed on a battery charger device incorporated into a milkhouse wash manifold.

One of the primary advantages of the present invention is that the milk flow indicator indicates the absence of milk repeatedly without having to manually reset the circuit. In other words, the liquid flow indicator of the present invention is automatically reset when flow resumes. This is important, especially in a milking operation. Some cows reduce milk flow near the end of their milking but then resume milk flow for a moderate period of time. The milk flow indicator can give a brief indication of "no milk" and automatically reset when milk resumes. Then, it will give another "no milk" indication when flow ceases. Thus, the flow indicator of the present invention reliably signals when a cow is milked out, alerting the milker to remove the unit. Should flow resume, the signal ends and the device is ready to detect the next flow stoppage. Further, the audible and visual signals alert the milker to prepare the next cow for milking.

The flow indicator of the present invention is easy to attach to any liquid flow line. It does not require any physical attachment in the way of power cords, vacuum hoses to the pulsator or pulsator hoses. It is also compact and portable.

The flow indicator of the present invention also reduces the tedious job of walking back and forth checking cows. This means improved udder health and more efficient and consistent milking. The milkers will spend less time determining when the cows are milked out, leaving more time for proper preparation and teat dipping.

Further, by using a battery powered energy source, the voltage in the system is far lower than the line current powered systems electrical circuits of the prior art. The device is also isolated from ground thus eliminating any stray voltage. This eliminates or at least substantially reduces the possibility of shocks to the animal and to the operators.

A primary object of the present invention is to overcome the disadvantages of the prior art.

It is also an object of the present invention to provide a liquid flow sensor which is useful in determining the flow of liquid through a passageway or tube, without obstructing milk flow in any manner.

It is another object of the present invention to use a milk flow indicator which may be removed and transported to a combination cleaner/battery charger.

It is another object of the present invention to provide a battery operated, removable milk flow sensor in which the signaling device automatically activates or deactivates depending upon the level of milk flow through a sensor.

Other objects, advantages and features of the present invention will be apparent from the following specification when taken in conjunction with the accompanying drawings.

DETAILED DESCRIPTION OF THE INVENTION

Figure 1:
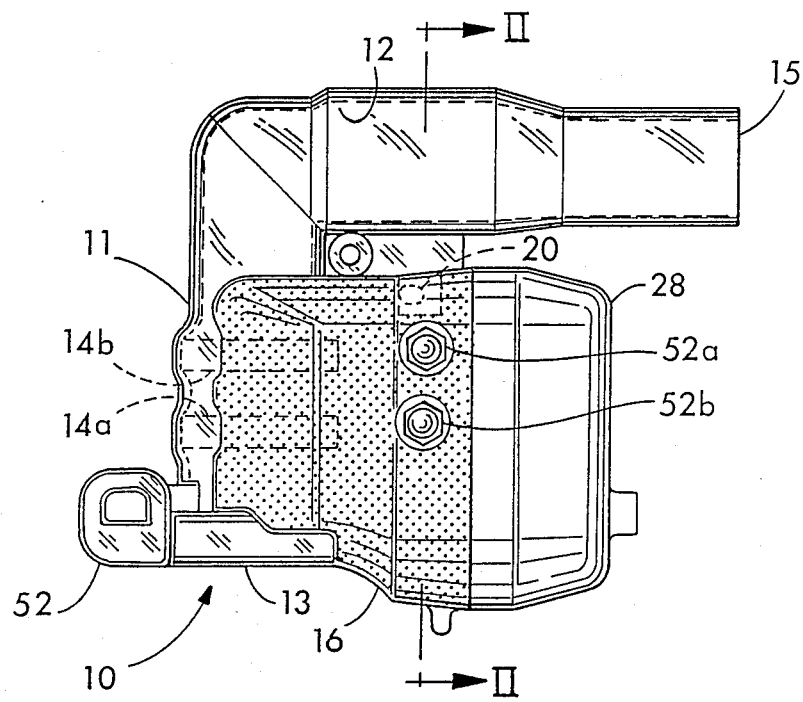
FIG. 1 is a side elevation view of a milk flow indicator constructed in accordance with the present invention.

The device of the present invention is a portable and detachable milk flow sensor which signals milk flow stoppage by a visual and audible alarm signal. In a milking operation, the device of the present invention is placed between the claw and the main milk line and serves to indicate when the milk flow from each cow reduces to the point where the teat cup should be removed. If the milk flow should resume after the initial reduction, the signal automatically stops without requiring any manual resetting. When the entire milking operation is complete, the flow indicator may be removed from the milking stanchion and placed on a battery charger device constructed as a part of the milk wash manifold.

The device of the present invention will now be described with reference to FIGS. 1-6, wherein like reference numerals will refer to the same features throughout the drawings. Referring now to FIGS. 1-6, a self contained, battery-powered milk flow indicator 10 is shown. In a milking operation, one milk flow indicator 10 is designed to be placed between a milking teat claw and the main milk line (not shown) to indicate when the milk flow from each cow reduces.

The flow indicator 10 has as its largest component a body member 11 which has formed in it a milk passageway 12 having an inlet 15 and an outlet 13. The diameter of the outer wall of the passageway 12 near the outlet 13 may be reduced somewhat in order to enable conventional milk line tubing to be attached thereon. The body member 11 of the milk flow indicator 10 also includes a housing 16 which houses the electrical circuit of the device of the present invention, and a battery cover 28. The body member 11 of the flow indicator 10, including the passageway 12 and the housing 16, is molded in a unitary structure of rigid, durable, preferably translucent material, such as a synthetic resin or plastic.

The flow indicator 10 has mounted inside of it a pair of conductive annular electrodes 14a and 14b respectively mounted in parallel, spaced-apart relationship on the inner circumferential periphery of the passageway 12 and jointly functioning as a conductivity electrode or electric flow sensor 14. The flow sensor 14 provides an electrical conducting path through the milk when milk flows through the passageway 12 and has a conductivity through the milk, which is lower or higher in accordance with the flow of the milk. As milk continues to flow in the passageway, the conductivity is high. However, as milk flow reduces, the conductivity becomes low.

An electrical circuit is located on a circuit board sealed in the housing 16 of the liquid flow indicator 10, and is held sealed in place in the housing 16 by a nonconductive, moisture proof, potting compound, of which many types are commercially available. Besides holding the electrical circuit in place, the potting compound provides a noncorrosive, liquid-tight protective cover for the electronic circuit. The detail of the electrical circuitry will be explained further on in the specification with reference to FIG. 6. Briefly, the electrical circuitry monitors the flow of milk through the sensors 14 in the passageway 12 and senses when this flow has substantially stopped. The milk flow is sensed by passing an electrical current through the milk between electrodes 14a and 14b to detect the presence of milk. When the milk flow has stopped, the passageway 12 empties thus reducing the electric current.

Reducing the flow of the electric current activates an alarm device which signals the end of the milking period. The alarm is both audible and visual. The audible alarm is in the form of a 4–5 second beeper, known to the art, connected to the electrical circuitry. A speaker or beeper 18, shown in FIG. 2, emits a sound loud enough to alert a technician that the milking period is over. Additionally, a flashing light in the form of a light-emitting diode or LED, generally located at 20, is used to alert the technician. The LED 20 is positioned on the circuit board sealed in the housing 16 so that it is adjacent to the inside of the housing 16 so that it is visible from the exterior of the housing 16 when it is illuminated. Preferably there are two LED's 20, one on each side of the indicator 10. In operation, the end of the milking period is signified by both a beeping alarm sound and a flashing light. After 4–5 seconds, the audible alarm terminates, leaving the light flashing until milk flow resumes in the passageway 12, either by a resurgence of milk by the present animal or by connecting up a new animal to the system.

The liquid flow indicator 10 is preferably powered by a small rechargeable 7.2 volt battery 22 which is connected to positive and negative battery terminals 24a and 24b within a battery chamber 26 under the battery cover 28. When the battery 22 is in place, the battery cover 28 snaps onto the housing 16 of the liquid flow indicator 10. The battery cover 28 further includes a channel 30 which connects the beeper 18 to the exterior of the indicator 10 through a diaphragm 31 when the battery cover 28 is in place. The diaphragm 31 isolates the beeper 18 from water and debris while allowing transmission of sound. The channel 30 provides a resonant cavity allowing and enhancing expression of the alarm sound from the beeper 18. The resonant cavity of the channel 30 is in the form of a slot approximately 0.312 by 0.375 by 1 inches.

A flow rate adjustment potentiometer 40 is provided within the housing 11 of the liquid flow indicator 10. Adjusting a set screw in the potentiometer 40 determines the sensitivity of the end-of-milk signal. The potentiometer 40 is operated by turning the set screw clockwise in order to allow a longer milking time before an alarm signal and turning counter-clockwise in order to allow a shorter milking time. A removable plastic plug 42 is placed on top of the set screw to prevent moisture damage to the potentiometer and the other electrical components and to prevent inadvertent turning of the set screw in the potentiometer.

Figure 2:
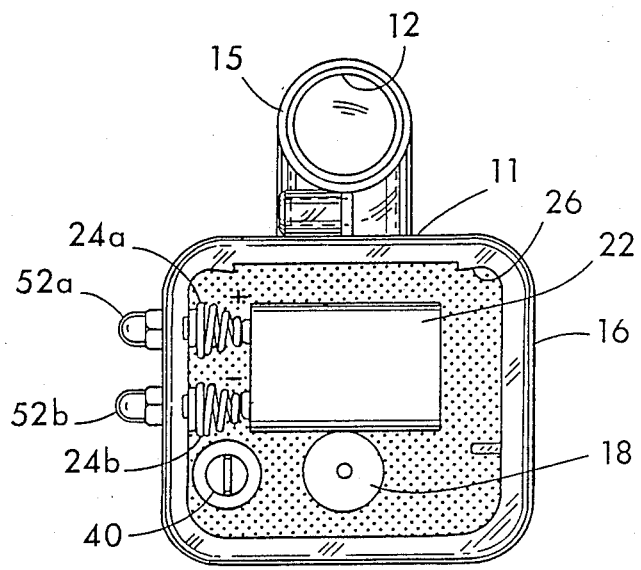
FIG. 2 is an end elevation view of the milk flow indicator of FIG. 1 with the cover removed.
Figure 3:
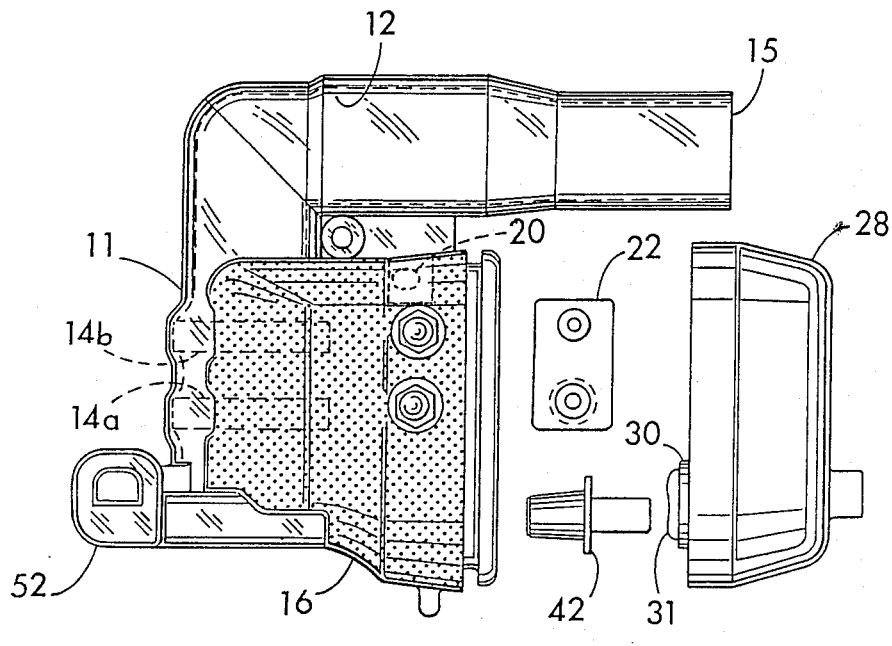
FIG. 3 is an exploded side elevation view of the milk flow indicator of FIG. 1.
Figure 4:
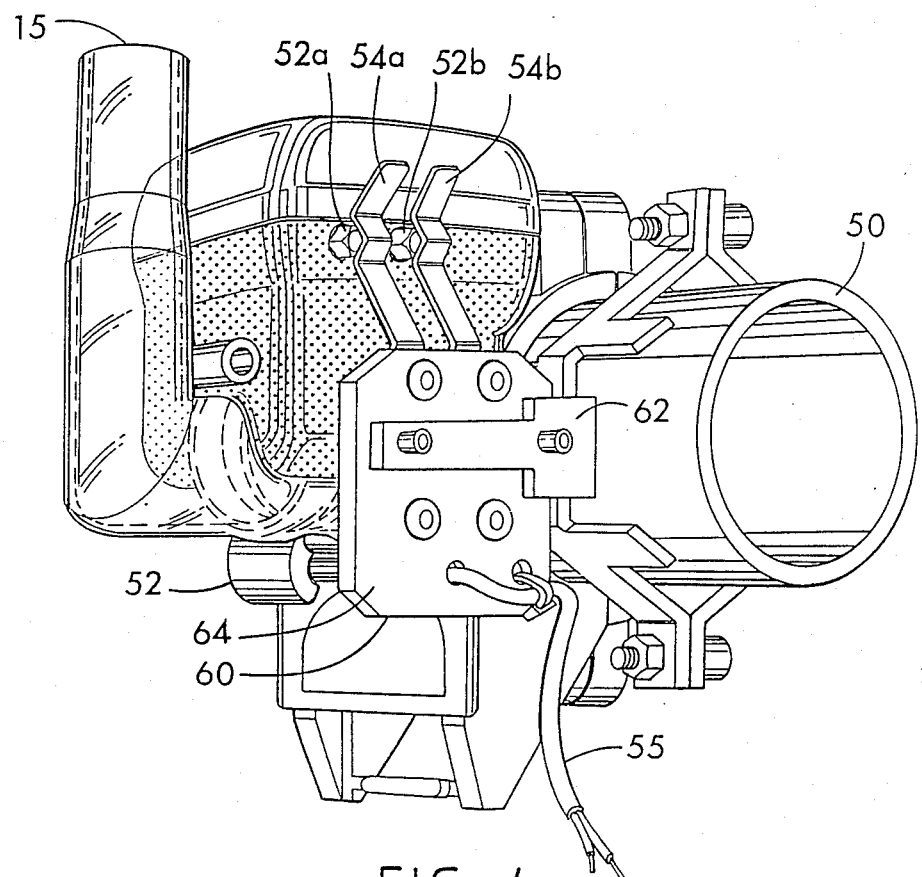
FIG. 4 is a perspective view of the milk flow indicator of FIG. 1 as placed on a wash manifold.
Figure 5:
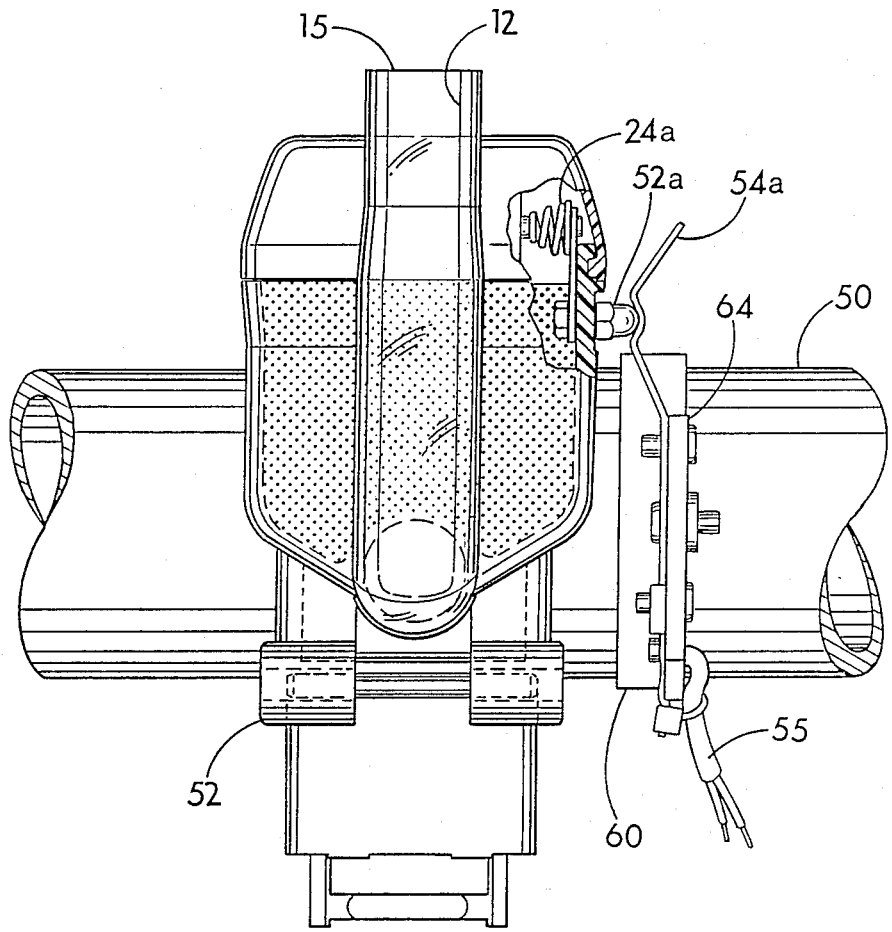
FIG. 5 is an end elevation view of the indicator and manifold of FIG. 4.
Figure 6:
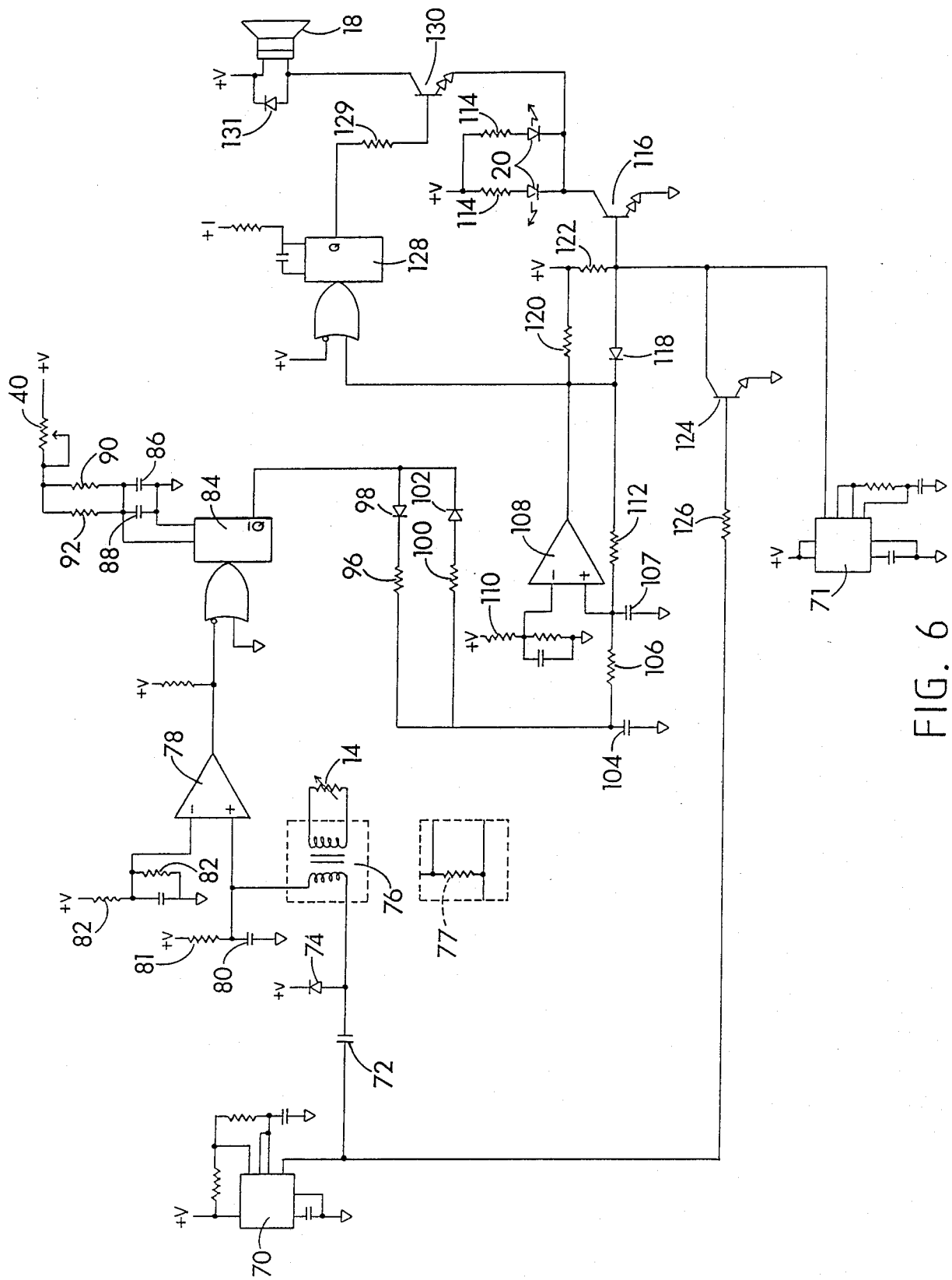
FIG. 6 is an electrical schematic diagram of the circuit of the indicator of FIG. 1.

Shown in FIG. 6 is a schematic diagram of the circuit for the milk flow indicator of FIGS. 1-3 which can be constructed on a circuit board to be incorporated in the housing 18. The circuit on the circuit board in the milk flow indicator also includes connections (not shown) to the battery. The battery output is connected to a regulated power supply integrated circuit (also not shown) in a manner well known to the art to generate a fixed voltage from ground for the remaining circuit elements of FIG. 6. In the circuit of FIG. 6, a multi-vibrator 70, which is a pulse train generating circuit, is provided with appropriate capacitors and resistors arranged to emit a constant, stable pulse train output signal. The pulsing output of the multi-vibrator 70 is connected through a coupling capacitor 72 and a clamping diode 74, intended to clamp the voltage below supply, to the milk sensor 14 in one of two manners.

In one variation, shown in FIG. 6, the output of the multivibrator 70 is connected into one side of the primary of a transformer 76, the other side of which is connected to the non-inverting input of a comparator 78. The secondary of the transformer 76 is connected through suitable physical connectors to the milk flow sensor 14 which, although physically composed of the spaced electrodes 14a and 14b, is represented in the electrical schematic view of FIG. 6 as a variable resistor. In a second variation, indicated by a dashed box located below the transformer 76 in FIG. 6, and to be substituted in the circuit for the dashed box containing the transformer 76, the transformer 76 is replaced by a resistor 77 connected in parallel with the electrodes 14. The resistor 77 may be used in most applications, although the transformer 76 may be needed if the circuit is in any way grounded, to avoid stray voltage through the milk line.

A resistor 81 connected to the supply voltage and a noise reduction capacitor 80 are also connected to the non-inverting input of the comparator 78. The inverting input of tee comparator 78 is connected to a resistive bridge 82 so that it is held at a fixed voltage. In function, the pulse train, which is the output of the multi-vibrator 70, is coupled through the capacitor 72 and to a series circuit composed of the resistor 81 in series either with the transformer 6, or with the parallel resistors 77 and 14. If there is conductivity between the secondary electrodes of the electrodes 14a and 14b, which is the case when milk is flowing between the electrodes 14a and 14b, then the negative going pulses are applied into the non-inverting input to the comparator 78 to reduce that input to a voltage less than the reference voltage on the inverting input, thereby causing the output of the comparator 78 to switch. When milk is not flowing, the negative pulses from the comparator 78 are attenuated, since the resistance of the sensor 14 is high, so that the pulses never drop below the reference voltage and the output of the comparator 78 remains high. Thus the output of the comparator is a pulse train consisting of a series of negative pulses if, and only if, there is milk flow through the milk passageway 12 between the electrodes 14a and 14b.

The output of the comparator 78 is connected to the input of a retriggerable one-shot 84, which functions as a retriggerable time delay circuit creating a timed output pulse when triggered or retriggered. The timing inputs to the one-shot 84 consist of a pair of capacitors 86 and 88 which are connected in parallel in a series with a pair of resistors 90 and 92 which are in turn further linked in series with a variable resistance in the form of the potentiometer 40. Potentiometer 40 is the same potentiometer whose resistance may be adjusted by operation of the screw illustrated in FIG. 2. The resistive and capacitive values in the timing circuit connected to the one-shot 84 are selected so as to provide a timed pulse output of the one-shot 84 which is variable in length between 1.75 and 4.5 seconds, depending on the setting of the potentiometer 40. The one-shot 84 is therefore programmed to emit a pulse instantly upon the commencement of milk flow activity, as indicated by a pulse output from the comparator 78, and to maintain that pulse output, because it is continuously retriggered, for as long as milk flows through the indicator 10. If milk flow should cease for a time period less than the time period of the one-shot 84, the one-shot 84 would not time out and would be retriggered by the next subsequent pulse indicating milk flow. If milk flow ceases for a time period longer than the pulse time, the one-shot 84 would then time out. Thus the period of absence of milk flow used to indicate a cessation of milk flow from the animal, can be adjusted by the setting of the potentiometer 40.

The inverted output of the one-shot 84 is connected through a pair of resistor and diode series connected in parallel. Resistor 96 and diode 98, with the anode of diode 98 toward the one-shot 84, is active when the one-shot 84 turns off, or when its inverted output is high, to charge a capacitor 104 to which resistor 96 is connected. The resistor 100 and the diode 102, with its cathode toward the one-shot 84, will be active when the inverted output of the one-shot 84 is low to discharge the capacitor 104. Both of the resistors 96 and 100 are connected to the capacitor 104 the other side of which is connected to ground. Thus the combination of the resistors 96 and 100 and the diodes 98 and 102, in conjunction with the capacitor 104, makes an RC timing network that provides a time delay during turn on or turn off of the output of the one-shot 84. The output of the one-shot 84, subject to this time delay, is coupled through the resistor 106 to the non-inverting input of another comparator 108. The inverting input to the comparator 108 is also held at a fixed voltage by a resistive bridge consisting of two resistors 110. A capacitor 107 is connected to ground for noise reduction. The output of the comparator 108 is also linked back through a resistor 112 to its non-inverting input. In essence, when the one-shot 84 is triggered, its inverted output goes low, which discharges the capacitor 104 through the resistor 100 and diode 102, and drags the non-inverting input to the comparator 108 low. At that point the output of the comparator 108 then goes low and further reinforces the low condition through the feedback resistor 112. When the one-shot 84 times out, as when there is no milk flow, its non-inverting output goes high, which charges the capacitor 104 through the diode 98 and the resistor 96, which brings the non-inverting input to the comparator 108 high, thereby causing the output of the comparator 108 to go high, which further feeds upon itself through the resistor 112. Thus the output of the comparator 108 is the logical inverse of milk flow in that its output is high when there is no milk flow and low when there is milk flow.

A pair of light-emitting diodes (LEDs) 112 located in series with limiting resistors 114 serve as the visual indication of the condition of milk flow. The cathode of both of the LEDs 112 are connected through a transistor 116 to ground. The base of the transistor 116 is connected through diode 118, which is connected in parallel with resistors 120 and 122, to the output of the comparator 108. The base of the transistor 116 is connected, in addition, to the output of another multivibrator 71. The base of the transistor 116 is also connected through a transistor 124 to ground, with the base connection to the transistor 124 being connected through a resistor 126 to the output of the multi-vibrator 70. The output of the multi-vibrator 70 is thus conducted through the transistor 124, which continually switches on and off. This switching of the transistor 124 will switch the transistor 116 continually on and off, if not clamped off by the comparator 108. If the output of the comparator 108 is high, indicating no milk flow, the switching of transistor 116 is not clamped and that is precisely what happens. The switching of the transistor 116 causes current pulses to flow through the LEDs 112 thereby providing a flashing visual indicator of no milk flow. If the output of the comparator 108 is low, that output, coupled through the diode 118, will clamp the transistor 116 off thereby preventing current flow through the LEDs 112 and holding those LEDs off.

The output of the comparator 108 is also connected to the input of a second one-shot 128, which has connected to it suitable resistive and capacitive timing components to give it a timed output of approximately four seconds. The non-inverted output of the one-shot 128 is connected through a resistor 129 to the base of a transistor 130 whose emitter is connected to the collector of the transistor 116 and whose collector is connected through the beeper 18 to the supply voltage. Thus, when the output of the comparator 108 goes high, indicating the end of milk flow, the one-shot 128 is triggered on for a four second time period. During that time period, its output is high thereby turning on the transistor 130, and allowing current flow through the beeper 18, as also controlled by the transistor 116. A diode 131 is connected in parallel with the beeper 18. Since the transistor 116 is switching on and off, the sound from the beeper is a series high frequency pulses whose pulse frequency is determined by the multivibrator 71 and whose sound is controlled by the speed of the multi-vibrator 70. At the end of four seconds, the one-shot 128 times out, and the beeper 118 turns off. The visual display of the flashing LEDs 112, while the milk flow is low or stopped, will continue as long as the circuit is connected to a supply voltage.

Thus, essentially the comparator 108 and the transistors 116, 124, and 130 function as a switching circuit to turn on the audible and visual indicators, the beeper 18 and the LED's 112, in response to the signal from the one-shot 84.

Thus the circuit of FIG. 6 is intended to accomplish the following objectives. The circuit allows for milk to cease flowing for an adjustable period of time before signaling an alarm indicating end of milk flow. This feature is accomplished by the retriggering of the one-shot 84 and the fact that the indication of end of milk flow does not occur until the one-shot 84 times out. If at any time during the timing period of the one-shot 84 milk flow is sensed again, the one-shot will be retriggered and the delay period will restart. Thus the circuitry never indicates no milk if milk flow resumes during that time period. In addition, the circuit never needs to be reset. This means that even after an audible and visual signal of no milk flow has occurred, if milk flow resumes, since one-shot 84 is promptly triggered and its effects cascade through the comparator 108, the signal of no milk flow is removed, only after the time delay of the resistor 100 and the capacitor 104, without the need for any additional resetting or operation by the user.

One of the major benefits of the self-contained liquid flow indicator 10 resides in its portability. When the milking operation is complete, the liquid flow indicator 10 may be easily removed from the milking line and placed on a wash manifold 50, illustrated in FIGS. 4 and 5, which incorporates a battery charger 60 therein. The wash manifold 50 is a piece of equipment found in the typical milkhouse adjacent to a milking parlor for cleaning milking equipment. The manifold 50 is a conduit through which hot, disinfectant fluids may be conducted to clean milking equipment. The mating fitting 52 located on the exterior of the indicator 10 is intended to mate with a common style of wash manifold fitting. The wash system may include other pipes or tubing to connect to the outlet 15 of the indicator 10 so that cleaning fluid may pass through the passageway 12 and be recovered.

While the liquid flow indicator 10 is being cleaned, the power source is automatically charged by the battery charger 60. Referring now to FIGS. 1 and 3, there is illustrated two contacts 52a and 52b which are connected to the contacts 24a and 24b which contact the battery 22. Preferably, the battery power source is a rechargeable source, such as a nickel-cadmium (NICAD) rechargeable battery. The battery charger 60 is mounted beside the wash manifold 50 in such a manner as to contact the contacts 52a and 52b when the milk flow indicator 10 itself is placed on the wash manifold for its normal daily cleaning.

The battery charger 60 is illustrated having a base 62 for securing the battery charger 60 on the washing line alongside the wash manifold 50. The battery charger 60 includes a printed circuit board 64 on which are located sealed components (not shown) to rectify and transform conventional AC power supply voltage levels to a DC voltage suitable to the battery 22. The DC voltage thus produced is connected to a pair of contact arms 54a and 54b. When the indicator 10 is placed correctly on the wash manifold 50, arms 54a and 54b will be in contact with contacts 52a and 52b. The battery charging device is connected to standard farm electrical supply by means of connecting wire 55. It is within the scope of the present invention to provide a series of wash manifold/battery charger which may be cleaned and charged simultaneously. The battery 22 in the indicator 10 is thus automatically and easily recharged daily as the indicator 10 is cleaned in its normal operation. Thus the indicator 10 is normally always near full charge and ready for use without particular attention to it.

Although the present invention has been described with preferred embodiments, it is to be understood that modifications and variations may be resorted to without departing from the spirit and scope of this invention, as those skilled in the art will readily understand.

What is claimed is:

1. A milk flow indicator adapted for insertion in the milk flow line of dairy barn milking equipment, the indicator comprising:

(a) a body member formed of a durable material having a milk flow passageway extending therethrough and a housing formed into it;

(b) electrical means for sensing milk flow received in the body member adjacent to the passageway;

(c) electrically actuated indicating means for indicating a presence of milk flow in the milk flow passageway;

(d) an electrical circuit received in and sealed into the housing for operating the sensing means ad the indicating means to sense milk flow and indicate the status of the flow;

(e) a rechargeable battery received in the indicator and electrically connected to the electrical circuit but isolated from ground and external electrical connections so that the indicator is portable and self-contained and can be inserted independently in the milk flow line without electrical connection and still indicate condition of milk flow; and (f) contacts mounted on the external surface of the indicator and electrically connected to the battery so that the battery can be recharged by external power without removal from the indicator.

2. A milk flow indicator as claimed in claim 1 wherein the electrical means for sensing milk flow includes a pair of spaced electrodes placed in the milk flow passageway in the body member so that milk flowing through the passageway forms an electrical path of conductivity between the two spaced electrodes.

3. A milk flow indicator as claimed in claim 1 wherein the electrically actuated indicating means includes both a visual indicator and an audible indicator for indicating the end of the presence of milk flow.

4. A milk flow indicator as claimed in claim 3 wherein the electric circuit includes an indicator timing circuit connected to the audible indicator so that the audible indication of milk flow extends for only a fixed time period after the sensing of a no milk flow condition.

5. A milk flow indicator as claimed in claim 3 wherein the visual indicator has at least one light emitting diode which is placed within the housing and wherein the housing is formed of a translucent material so that illumination of the light emitting diode can be perceived from the exterior of the housing of the body member.

6. A milk flow indicator as claimed in claim 1 wherein the electrical circuit includes a multivibrator whose output is conducted to the sensing means to be conducted therethrough and whose output is also connected to the indicating means to provide a pulsating indication when the indicating means is operated.

7. A milk flow indicator as claimed in claim 6 wherein the multivibrator output, as conducted through the electrical sensing means, is gated to an input of a timing circuit having a time period so that it continually retriggers the timing circuit as long as there is milk flow so that the timing circuit will only time out at the end of the presence of milk flow in excess of the time period of the timing circuit.

8. A milk flow indicator as claimed in claim 7 wherein there is a switching circuit connected to the indicating means to operate the indicating means with the timing with the switching circuit connected to the output of the timing circuit so that it only operates the indicating means upon the expiration of the time period of the timing circuit.

9. In a milk house having automated milkers, a milk flow line and a wash manifold, a milk flow indicator system comprising:

(a) a portable milk flow indicator including a body having a milk flow passageway therein; an electrically actuated sensor in the milk flow passageway; indicating means for indicating a presence of milk flow; an electrical circuit to operate the sensor and actuate the indicating means to indicate the presence of milk flow; a rechargeable battery connected to supply power to the electrical circuit; and a pair of contacts on the exterior of the indicator connected to the battery; and (b) a battery charger mounted on the wash manifold and connected to a supply voltage, the battery charger having a pair of contact arms and positioned on the wash manifold so that the arms will contact the contacts on the indicator when the indicator is placed on the wash manifold so that the battery in the indicator is automatically recharged during washing of the milk flow indicator.

10. A milk flow indicator system as claimed in claim 9 wherein the electrically actuated sensor in the milk flow indicator includes a pair of spaced electrodes located in the milk flow passageway so as to form an electrically conducted path therebetween when milk flows therethrough.

11. A milk flow indicator system as claimed in claim 9 wherein the indicating means includes both visual and audible indicators of the condition of the milk flow.

12. A milk flow indicator system as claimed in claim 11 wherein the visual output is at least one light emitting diode and wherein the body of the milk flow indicator is formed of translucent material so that the illumination of the light emitting diode can be viewed from the exterior of the milk flow indicator.

13. A milk flow indicator system as claimed in claim 9 wherein the contact arms on the battery charger consist of elongated flat strips of metal bent into such a shape as to automatically contact the contacts on the indicator when the indicator is placed on the wash manifold.

14. A milk flow indicator comprising:

(a) a pair of spaced electrodes located in the path of milk flow;

(b) a multivibrator creating a pulse train applied through the spaced electrodes;

(c) a retriggerable time delay circuit, creating a timed pulse when triggered, connected to the output of the electrodes so that it is continually retriggered if milk flows between the electrodes;

(d) indicating means to indicate to a user the absence of milk flow; and (e) a switching circuit connected to the indicating means to operate the indicating means, the switching circuit also connected to the output of the time delay circuit in such a way that the switching circuit is activated to switch off the indicating means only during the timed pulse of the time delay circuit, so that the indicating means is activated to turn on the indicating means after expiration of the timed pulse delay after the milk flow ceases, but always activates to turn off the indicating means whenever there is milk flow, without the need for resetting or manual operation.

15. A milk flow indicator as claimed in claim 14 wherein there is a transformer conducting an output of the multivibrator to the spaced electrodes with the spaced electrodes connected to a secondary output of the transformer.

16. A milk flow indicator as claimed in claim 14 wherein the retriggerable time delay circuit consists of an one-shot having a time period selected to be significantly longer that the time period between pulses of the pulse train of the multivibrator so that the one-shot is continually retriggered when milk is flowing between the spaced electrodes.

17. A milk flow indicator as claimed in claim 16 wherein the one-shot has connected to it resistive and capacitive timing components to control the timing of the timed pulse which is the output thereof and wherein the resistive component includes a potentiometer which is adjustable to adjust the length of the time pulse created by the one-shot.

18. A milk flow indicator as claimed in claim 17 wherein the multivibrator, the time delay circuit, the indicator means, and the switching circuit are all contained on a circuit board which is sealed into a housing contained in a body member holding the milk flow indicator by a potting compound, and wherein there is a channel created in the potting compound for insertion of a screwdriver to adjust the potentiometer in the timing circuit of the one-shot.

19. A milk flow indicator as claimed in claim 14 wherein the indicating means includes at least one light emitting diode positioned so that the illumination of the light emitting diode can be viewed by a user.

20. A milk flow indicator as claimed in claim 14 wherein the switching circuit include at least one transistor located in parallel with the indicating means so that current conducted through the transistor actuates operation of the indicating means.

21. A milk flow indicator as indicated in claim 20 wherein the switching circuit also includes an indicator time delay constructed so that at least a portion of the indicating means only operates for a fixed time period upon the sensing of the absence of milk flow.

* * * * *